No. 623,867. Patented Apr. 25, 1899.
A. J. BELOHLAVEK.
BUTTONHOLE CUTTING ATTACHMENT FOR SHEARS.
(Application filed Feb. 9, 1899.)
(No Model.)
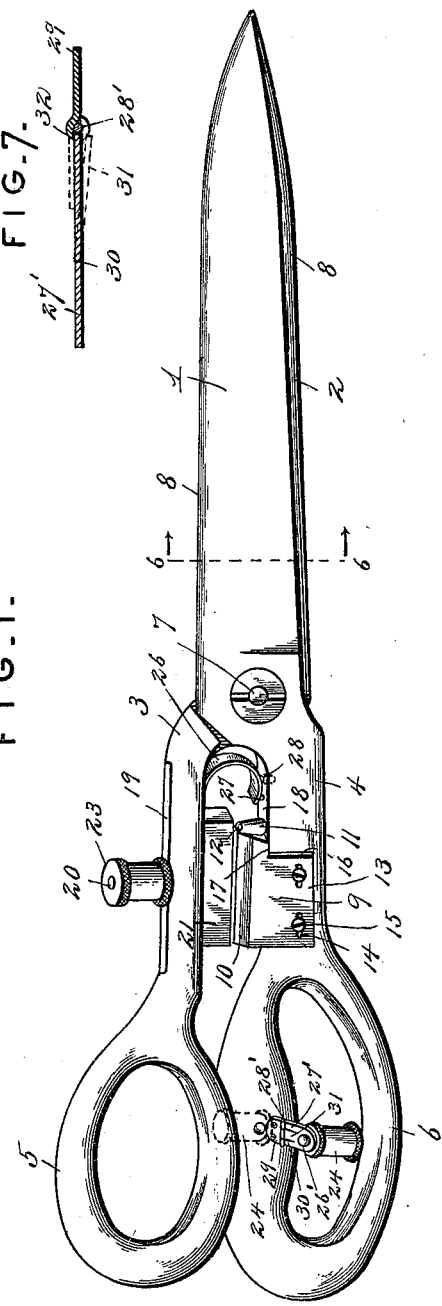
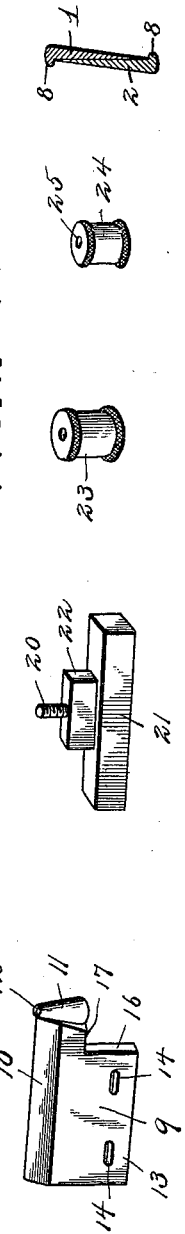
Witnesses
Harry L. Amer.
K. G. Nau.
Inventor
Anton J. Belohlavek.
By V. D. Stockbridge,
His Attorney.
THE NORRIS PETERS CO., PHOTO-LITHO., WASHINGTON, D. C.

UNITED STATES PATENT OFFICE.

ANTON J. BELOHLAVEK, OF CLEVELAND, OHIO.

BUTTONHOLE-CUTTING ATTACHMENT FOR SHEARS.

SPECIFICATION forming part of Letters Patent No. 623,867, dated April 25, 1899.

Application filed February 9, 1899. Serial No. 705,097. (No model.)

*To all whom it may concern:*

Be it known that I, ANTON J. BELOHLAVEK, a citizen of the United States, residing at Cleveland, in the county of Cuyahoga and State of Ohio, have invented certain new and useful Improvements in Buttonhole-Cutting Attachments for Shears; and I do hereby declare the following to be a full, clear, and exact description of the invention, such as will enable others skilled in the art to which it appertains to make and use the same.

This invention relates to buttonhole-cutting attachments for shears; and the object in view is to provide, in connection with a pair of shears, cutting-dies adjustably connected to the shank portions or handles of the shears in such manner that the blades of the shears may be used as handles or levers for operating the cutting-dies, the blades themselves preferably being of special construction and the dies being adjustable, so that the length or size of the buttonhole may be increased or diminished at will.

The invention also contemplates the provision of a special spring which may be thrown into and out of operation and which when in operative position will serve to normally hold the cutting-dies away from each other to facilitate the insertion of the material in which the buttonhole is to be formed.

The detailed objects and advantages of the invention will appear more fully in the course of the subjoined description.

The invention consists in certain novel features and details of construction and arrangement of parts, as hereinafter fully described, illustrated in the drawings, and incorporated in the claims.

In the accompanying drawings, Figure 1 is a perspective view of a pair of shears with the attachment applied thereto. Fig. 2 is a detail perspective view of the main cutting-die. Fig. 3 is a similar view of the adjustable block or anvil. Figs. 4 and 5 are detail views of the nut for the adjustable block and the screw or gage for regulating the distance between the adjacent faces of the cutting-dies. Fig. 6 is a detail cross-section through the cutting-blades. Fig. 7 is a detail longitudinal section through the stop shown applied to one of the handles in Fig. 1.

Similar numerals of reference designate corresponding parts in all the views.

The shears to which the improvements are applied are constructed in the main in the ordinary manner, consisting of the blades 1 and 2, having shanks 3 and 4, respectively, and handles 5 and 6, the handles and blades being pivotally connected at 7.

In carrying out the present invention the outer edges of the blades 1 and 2 are materially thickened, as indicated at 8, and are also extended or bent over laterally to form flanges, which give a broader bearing-surface for the operator's hands, and thus adapt the blades for use as handles when operating the buttonhole-cutting attachment.

The main cutting-die (indicated at 9) comprises a cutting edge 10, terminating in a conical end 11, which is hollow and comprises a circular or annular cutting edge 12. The die also comprises an integral plate or flange 13, having elongated slots 14, through which pass screws 15, which enter the shank 4 and enable the cutting-die 9 to be adjusted, so as to bring its cutting edge into parallel relation to the surface of the adjustable block, hereinabove described, and also to enable the cutter 9 to be adjustable slightly in a longitudinal direction. The die or cutter 9 is cut away at 16 to form a shoulder 17, which bears solidly upon the surface 18 of the shank 4, said surface forming a rest for that portion of the cutting-die.

The shank 3 is provided with a longitudinal slot 19, through which passes the screw-threaded shank of a longitudinally-adjustable oblong block 21, forming the other cutter, which is arranged exactly opposite the cutter or die 9. The block 21 is provided with a shank or reduced portion 22, which moves longitudinally within the slot 19 and prevents the block 21 from twisting and becoming disposed at an angle. Upon the threaded stem or shank 20, which extends through and outside of the slot 19, is placed a milled nut 23, by which the block may be adjusted and clamped at any desired point.

The cutting-dies are held apart by means of a curved leaf-spring 26, one end of which is secured to the shank of one of the blades, the opposite free end of the spring having a stud 27, which may be removably fitted in a socket 28 in the shank of the other blade.

When the stud 27 is disengaged from the socket 28, the implement is adapted for use as an ordinary pair of shears. When it is desired to bring into use the buttonhole-cutter, the stud 27 is inserted in the socket 28 and the spring 26 acts to normally hold the cutting-dies apart, so that the cloth or other material in which the buttonholes are to be formed may be readily inserted between the cutters. By adjusting the block 21 toward the spring 26 the size of the buttonholes may be decreased, and by moving it in the opposite direction the size of the buttonhole may be increased.

The distance between the cutting-dies is adjusted by means of a nut 24, which has a centrally-threaded opening 25 to receive a threaded stem 26', which is fast in the outer end of a plate 27', hinged at 28' to another plate 29, secured to one of the handles of the shears, as shown in Fig. 1. By reference to Figs. 1 and 7 it will be seen that the plate 27' is provided with parallel slits 30, which form between them a spring 31, which coöperates with a shoulder 32 on the plate 29, thereby serving to hold the screw 24 inward between the two handles 5 and 6, as shown in dotted lines in Fig. 1, or outward, as shown in full lines in Fig. 1. This facilitates the insertion of the cloth or other material between the handles preparatory to the formation of the buttonhole therein. By adjusting the nut 24 the inward movement of the handles 5 and 6 toward each other, and consequently the cutting-dies, is limited and regulated.

Changes in the form, proportion, and minor details of construction may be resorted to without departing from the principle or sacrificing any of the advantages of the invention.

Having thus described the invention, what is claimed as new, and desired to be secured by Letters Patent, is—

1. The combination with shears, of a cutter connected to the shank of one of the blades and comprising a straight cutting edge terminating in a circular cutting edge and also comprising a plate or flange provided with slots for the reception of fasteners which pass through the slots into the shank of the blade, a block arranged opposite said cutters, and having a reduced portion or shank which is adjustable longitudinally in the slot in the shank of the other blade, said block also having a screw-threaded stem, and a nut engaging said stem and providing for the adjustment of the block, substantially as described.

2. The combination with shears, of adjustable cutting-dies connected to the shanks of the blades in rear of their pivotal connection, and a spring for holding the cutting-dies away from each other, said spring being connected at one end to the shank of one of the blades and detachably connected at its opposite end to the shank of the other blade, substantially as described.

3. The combination with shears, of a pair of dies adjustably connected to the shanks of the blades in rear of their pivotal connection, and a spring having one end connected to the shank of one blade and provided at its other end with a stud detachably engaged with the socket in the shank of the other blade, substantially as described.

4. A pair of shears having the outer edges of the blades thickened and extended laterally, as specified, in combination with cutting-dies adjustably connected to the shanks of the blades in rear of their pivotal connection, and a curved spring connected fixedly at one end to the shank of one of the blades and provided at its other end with a stud which is removably fitted in a socket in the shank of the other blade, substantially as described.

5. A pair of shears having in combination therewith buttonhole-cutting dies secured to the shanks of the blades between the pivot and the handles, and a limiting-stop arranged to fold between the handles or laterally upon the side thereof, substantially as described.

6. A pair of shears having in combination therewith cutting-dies connected to the shanks of the handles, and an adjustable stop mounted between the handles and secured to a spring-controlled plate having a hinged relation to one of the handles, substantially as described.

7. The combination with a pair of shears, of a plate hinged to one of the handles, a limiting-stop adjustably mounted on the other end of said plate, and a spring operating in connection with said plate to hold the stop inward between the handles or outward laterally therefrom, substantially as described.

In testimony whereof I affix my signature in presence of two witnesses.

ANTON J. BELOHLAVEK.

Witnesses:
EDWARD F. SPURNEY,
CHARLES J. RAUS.